United States Patent
Seidel

(10) Patent No.: US 10,551,257 B2
(45) Date of Patent: Feb. 4, 2020

(54) RAILWAY FREIGHT CAR COUPLING FORCE MONITORING SYSTEM

(71) Applicant: AMSTED RAIL COMPANY, INC., Chicago, IL (US)

(72) Inventor: Andrew Seidel, Camp Hill, PA (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 102 days.

(21) Appl. No.: 15/624,143

(22) Filed: Jun. 15, 2017

(65) Prior Publication Data

US 2018/0364117 A1 Dec. 20, 2018

(51) Int. Cl.
*G01L 5/00* (2006.01)
*G01M 17/08* (2006.01)
*G01L 1/22* (2006.01)

(52) U.S. Cl.
CPC .............. *G01L 5/00* (2013.01); *G01L 1/2206* (2013.01); *G01L 1/2281* (2013.01); *G01M 17/08* (2013.01)

(58) Field of Classification Search
CPC ....... G01L 5/00; G01L 1/2206; G01L 1/2281; G01M 17/08
USPC ............................................ 73/117.01, 117.1
See application file for complete search history.

(56) References Cited

U.S. PATENT DOCUMENTS

| | | | |
|---|---|---|---|
| 2,601,781 A | 7/1952 | Fillion | |
| 4,042,810 A * | 8/1977 | Mosher | G09B 9/04 701/19 |
| 4,838,173 A | 6/1989 | Schroeder et al. | |
| 5,325,700 A | 7/1994 | Litten | |
| 5,883,337 A * | 3/1999 | Dolan | G01G 19/047 177/163 |
| 7,926,427 B1 | 4/2011 | Ricks et al. | |
| 2008/0128562 A1 | 6/2008 | Kumar et al. | |
| 2010/0174427 A1* | 7/2010 | Sivasubramaniam | B61L 3/006 701/19 |
| 2012/0138752 A1* | 6/2012 | Carlson | B61L 1/164 246/126 |
| 2014/0162528 A1 | 6/2014 | Derby, Jr. | |
| 2015/0219487 A1 | 8/2015 | Maraini | |
| 2016/0137212 A1 | 5/2016 | James et al. | |

FOREIGN PATENT DOCUMENTS

EP 0884570 A1 12/1998

OTHER PUBLICATIONS

International Search Report and Written Opinion in corresponding International Application No. PCT/US2018/037574, dated Sep. 11, 2018, 10 pages.

* cited by examiner

*Primary Examiner* — Max H Noori
(74) *Attorney, Agent, or Firm* — Joseph M. Butscher; The Small Patent Law Group, LLC

(57) ABSTRACT

A system for measuring in-train and coupling forces of freight rail cars is provided. The system includes at least four strain sensing elements mounted to the coupler of a railway vehicle. Signals from the strain sensing elements are transmitted to a receiver where they are converted into force readings.

31 Claims, 3 Drawing Sheets

RAILWAY FREIGHT CAR COUPLING FORCE MONITORING SYSTEM

BACKGROUND OF THE INVENTION

The present invention relates to a system for measuring and recording the coupling and in-train forces which are present during the operation of freight rail cars.

It is desirable to be able to obtain accurate coupling and in-train force measurements for railway freight vehicles which are deployed in switching yards or which are operating over the rail in general revenue service. It is especially desirable to be able to obtain these force measurements in real time, without the need for the rail car to be outfitted with wired force measurement instrumentation.

It is also desirable to be able to transmit a signal indicative of coupler force to a remote location wherein such a signal can be processed and stored.

Accordingly, it is an object of the present invention to provide a method and apparatus for measuring the coupling and in-train forces in a railway freight vehicle and to transmit a signal indicative of such forces to a receiver.

SUMMARY OF THE INVENTION

This invention covers several embodiments of a system for measuring the quasi-static and dynamic forces which are present at the coupler connections between freight railway vehicles. In one embodiment, strain sensing elements are mounted symmetrically to machined surfaces on opposite sides of the exterior shank of the coupler. In this embodiment, axial strains as well as Poisson strains are measured and converted to a corresponding value for force applied along the inline axis of the coupler. Wireless sensors are used to read and transmit the output from the transducers to a remote location.

DETAILED DESCRIPTION OF THE INVENTION

Figure 1:
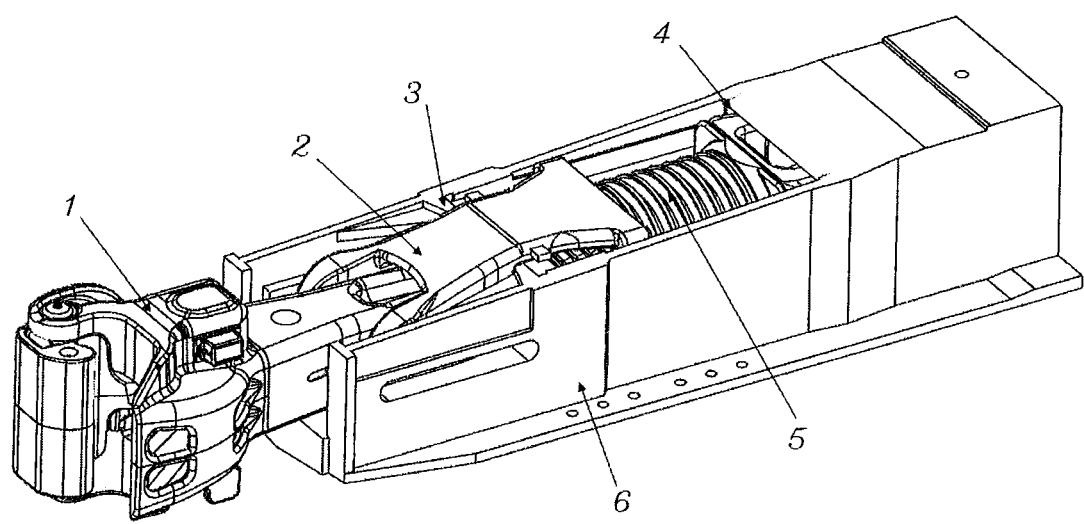
FIG. 1 is a perspective view of an end of car coupling system consisting of a coupler, draft gear with yoke, and a draft sill in accordance with an embodiment of the present invention.

A typical end of car coupling system is shown in FIG. 1. This includes a coupler 1 which extends outward from the opening of a draft sill 6. The coupler 1 is supported at one end by the draft sill 6 and at the other end by a draft gear or cushion unit 5 with an attached yoke 2 and either a key or pin type connection 9. The draft gear or cushion unit 5 is constrained within the draft sill 6 by a pair of front stops 3 and a pair of rear stops 4.

Figure 2:
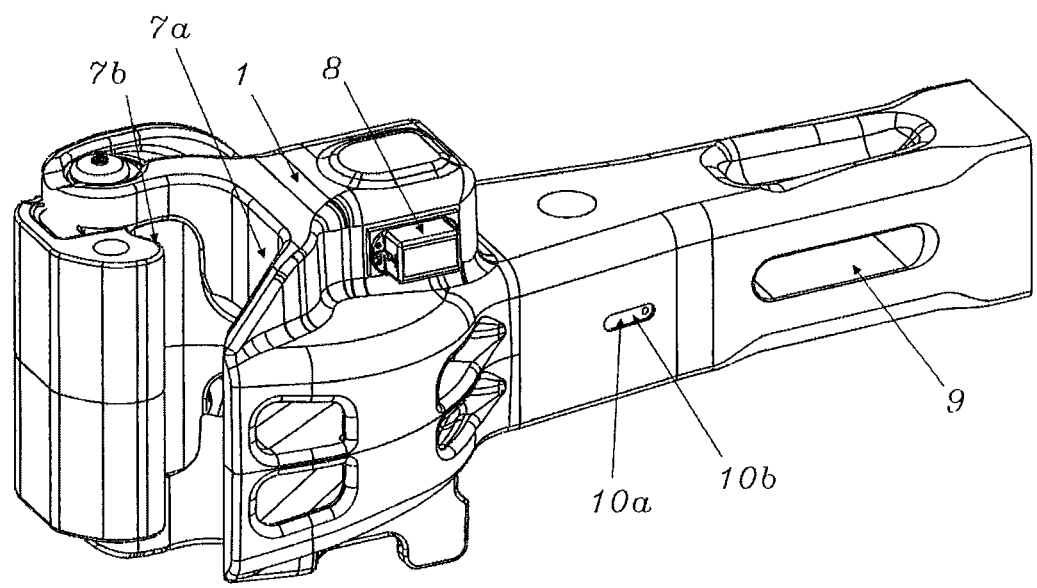
FIG. 2 is a perspective view of an embodiment of the invention with strain sensing elements symmetrically mounted to a machined surface on the exterior shank of the coupler.
Figure 3:
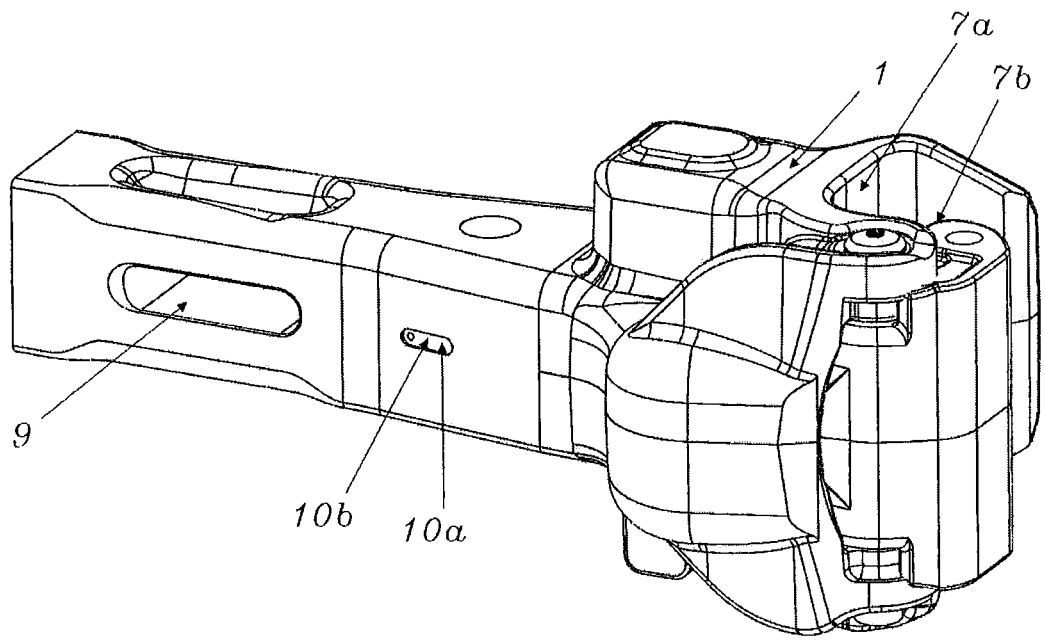
FIG. 3 is a perspective view of an embodiment of the invention with strain sensing elements symmetrically mounted to a machined surface on the opposite exterior shank of the coupler.

The first embodiment of the invention is shown in FIG. 2 and FIG. 3, including a coupler 1, wireless sensing unit 8, and two strain sensing elements 10a and 10b mounted on each side of the coupler shank. The strain sensing elements 10a and 10b are mounted to machined surfaces on opposite sides of the coupler shank in locations selected using analytical numerical stress analysis techniques. Additionally, areas identified using computational techniques are verified using experimental stress analysis, which may include the use of strain gages and/or displacement transducers. In this embodiment of the invention, strain sensing elements are mounted in locations that are minimally sensitive to bending moments caused by forces applied at the contacting face of the coupler 7a or coupler knuckle 7b while also being maximally sensitive to in-line forces applied at the contacting face of the coupler 7a or coupler knuckle 7b.

In the preferred embodiment of the invention, the strain sensing elements 10a and 10b are rigidly attached to machined surfaces on the exterior shank of the coupler 1 by using adhesives, although other techniques may be used including welding, fasteners, or similar methods. The use of adhesives provides the most direct transfer of strain/displacement from the coupler casting 1 to the strain sensing elements 10a and 10b while minimizing the likelihood of adverse effects due to the mounting technique. The strain sensing elements 10a and 10b produce an electrical output that is proportional to the strain/displacement on the machined surface of the coupler 1. In this embodiment of the invention two vertically mounted strain sensing elements 10a measure Poisson strain while two horizontally mounted strain sensing elements 10b measure in-line strain along the neutral axis of the coupler 1. Combining the output from each strain sensing element 10a and 10b when wired as a full Wheatstone bridge allows for accurate measurement of the resultant in-line forces along the length of the coupler 1.

The wireless sensing unit 8 interfaces directly with the strain sensing elements 10a and 10b with the primary function of reading and digitizing the output signal from the strain sensing elements 10a and 10b. In the preferred embodiment, the wireless sensing unit 8 contains a microprocessor unit with associated analog-to-digital (A/D) converters and signal conditioning, a power source, and a communications unit in the form of a wireless transmitter/receiver. The wireless sensing unit 8 may also contain additional sensing elements including inertial, temperature, or pressure sensors. These additional sensors may be used for logic and decision making on the integrity of transducer data. For example, transducer signals collected outside of the operating temperature limits of the transducer may be discarded using logic within the wireless sensing unit 8. The wireless sensing unit 8 communicates with a local communications manager which will be described hereafter.

Figure 4:
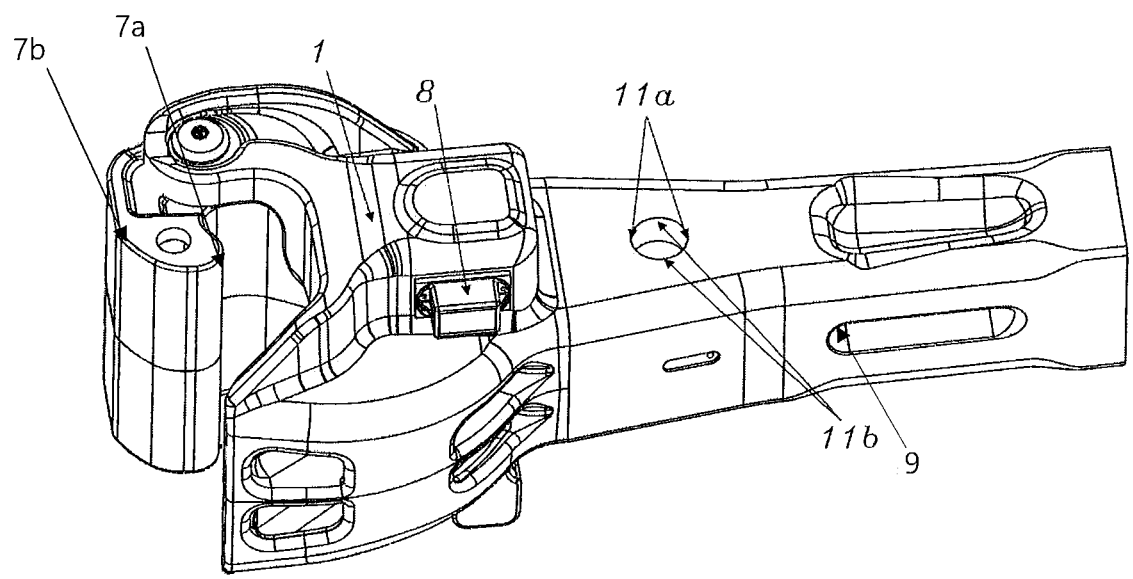
FIG. 4 is a perspective view of an embodiment of the invention with strain sensing elements symmetrically mounted around the circumference of a machined through hole at the top of the coupler.
Figure 5:
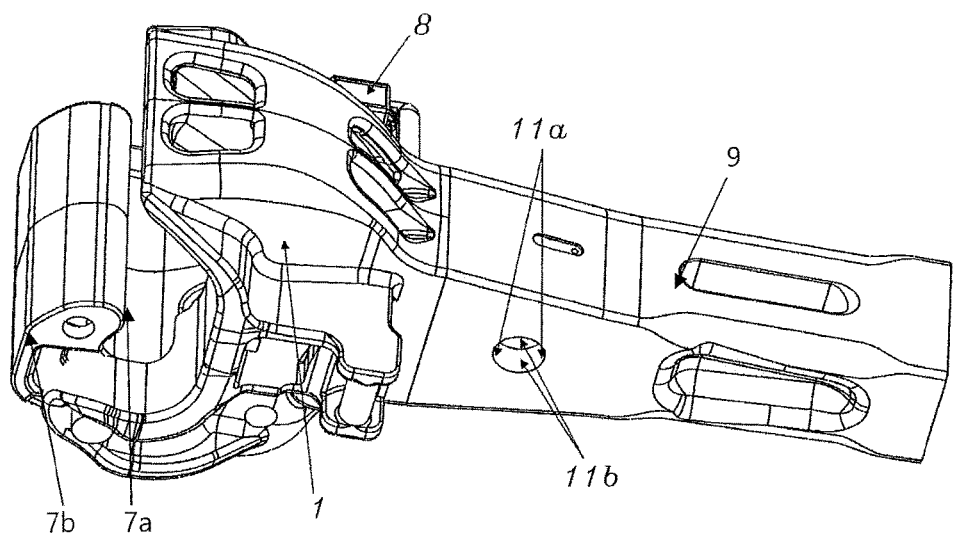
FIG. 5 is a perspective view of an embodiment of the invention with strain sensing elements symmetrically mounted around the circumference of a machined through hole at the bottom of the coupler.

A second embodiment of the invention is shown in FIG. 4 and FIG. 5, including a coupler 1, wireless sensing unit 8, and four strain sensing elements 11a and 11b mounted on machined through holes at the top and bottom surfaces of the coupler 1. This embodiment operates on the same principles described for the first embodiment in FIG. 2 and FIG. 3, with similar components having the same reference numerals, with the primary differences being the quantity of strain sensing elements utilized and the types of strains which are measured. In this embodiment of the invention, four strain sensing elements 11a and 11b are mounted 90° apart around the circumference of the top and bottom machined through holes. When forces are applied along the contacting face of the coupler 7a or coupler knuckle 7b the strain sensing elements 11a and 11b will ideally measure bending strains which are opposite in sign but equal in magnitude. Combining the output from each strain sensing element 11a and 11b when wired as a full Wheatstone bridge allows for accurate measurement of the resultant in-line forces along the length of the coupler 1.

These are the preferred embodiments of the invention, but the locations and quantities of strain sensing elements 10a, 10b, 11a, and 11b are not limited to those discussed herein and are used as examples only. In the most general sense, strain sensing elements can be located anywhere on the coupler 1 body where there is a change in strain/displacement in response to an applied load. The outputs from the strain sensing elements 10a, 10b, 11a, and 11b will remain relatively linear over the elastic range of the base material to which they are mounted. The strain sensing elements 10a, 10b, 11a, and 11b, which typically take the form of metal foil strain gages for both embodiments of the invention described herein, transmit strain/displacement from the surfaces of the coupler 1 where they are mounted. The locations and geometries of the machined surfaces where the strain gages are mounted have been chosen such that strain/displacement at those locations is mechanically amplified when possible. In the preferred embodiment of the invention, a total of four strain gages at locations 10a and 10b remain sensitive to changes in the axial and Poisson strains of the coupler 1 while remaining relatively insensitive to bending strains at those locations.

In the second embodiment of the invention, a total of eight strain gages at locations 11a and 11b remain sensitive to the bending strains around the circumference of the through holes where they are mounted, and thus the tensile and compressive strains/displacements at these locations are mechanically amplified. Both embodiments of the invention utilize full Wheatstone bridge configurations in order to produce an electrical output that is proportional to both the applied input voltage and strain/displacement input at the transducer mounting locations 10a, 10b, 11a, and 11b. Additionally, the wireless sensing unit 8 includes a temperature detector which is used to measure the temperature of the coupler 1 base material near the strain gage mounting locations 10a, 10b, 11a, and 11b. In the preferred embodiment, the temperature detector is of the form of a surface mounted resistance temperature detector (RTD), although similar detectors may be substituted.

As mentioned previously, the preferred embodiment of the invention utilizes metal foil strain gages as the strain/displacement transducers. However, it is possible to utilize other types of strain sensing elements in place of the strain gages as long as they provide an electrical output that is proportional to the mounting surface strain/displacement. Examples include linear variable differential transformers (LVDT), vibrating wire transducers (VWT), and fiber Bragg grating strain sensors. The discussed principles of operation apply to any of the aforementioned transducer types.

Figure 6:
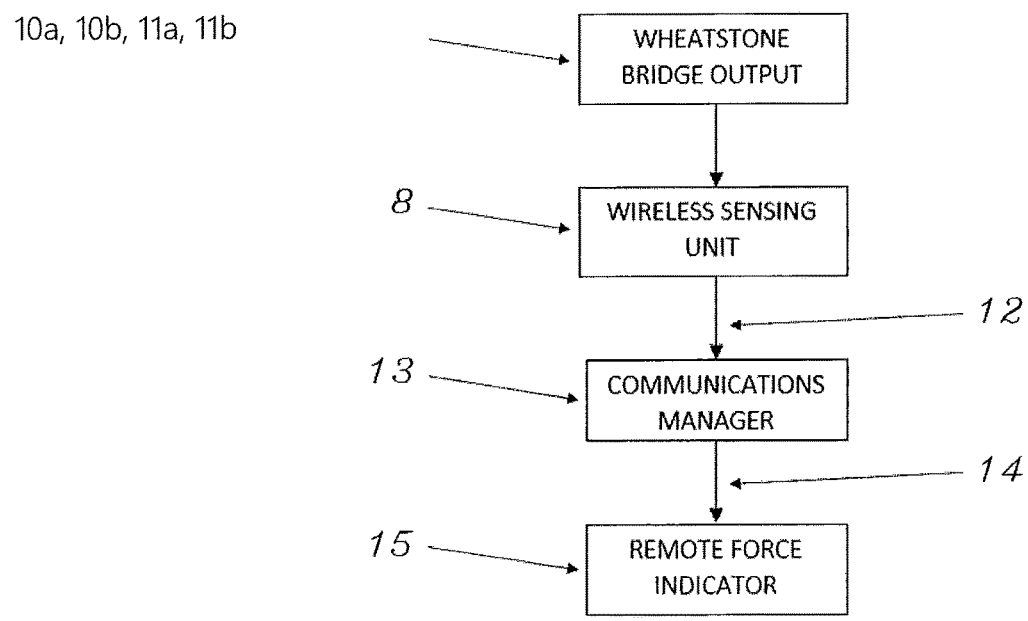
FIG. 6 is a schematic of the data flow from the strain sensing elements to a remote receiver, in accordance with an embodiment of the present invention.

FIG. 6 illustrates the preferred embodiment of the components of the present invention and their interactions. In this embodiment, outputs from the strain sensing elements 10a, 10b, or 11a, and 11b are sampled and conditioned by the wireless sensing unit 8. Conditioning includes amplifying the raw signal from the strain sensing elements 10a, 10b, or 11a, and 11b as well as filtering the signals to remove noise. The analog-to-digital converter (A/D) converts the conditioned signals into digital form with resolution at least $\frac{1}{5}$ of the system accuracy. The digitized output 12 is then sent wirelessly to a local communications manager 13 which is mounted on the rail vehicle car body. The manager 13 applies a calibration for each coupler force transducer using sealed parameters stored in the memory of the manager 13. The calibrated output from each coupler force transducer is sent wirelessly 14 to a remote force indicator 15 such as a dedicated computer or workstation. Wireless transmission 14 from the manager 13 to the remote receiver 15 can be achieved using various methods and will be discussed in more detail hereafter.

As noted previously, the preferred embodiment of the invention utilizes sealed calibration parameters in the communications manager 13 to convert the digital sensor data into force readings. In the present invention, strain sensing elements are mounted to areas of the coupler 1 body that have been analytically and experimentally proven to react with a high degree of repeatability to an applied load. However, it is recognized that there will likely be intrinsic variation in the relationship between applied load and strain/displacement which warrants a unique calibration for each coupler force transducer. Calibration of individual couplers can be achieved using a dedicated hydraulic load frame or dead weight test fixture to apply compressive loads through the contacting face of the coupler 7a or to apply tensile loads through the coupler knuckle 7b. The preferred calibration method abides by industry accepted calibration routines, such as ASTM E74 (Standard Practice of Calibration of Force-Measuring Instruments for Verifying the Force Indication of Testing Machines). In this preferred method, at least 5 ascending and descending calibration points are used and repeated at least 3 times. The use of such calibration practices ensures the highest degree of accuracy possible in the force readings for a given coupler force transducer.

It is commonly accepted that strain gage based transducers will exhibit some degree of zero-output shift with temperature change. In the preferred embodiment, a temperature sensor within the wireless sensing unit 8 is sampled with each transducer reading in order to apply correction algorithm. In the simplest form, correction algorithms utilize first-order linear relationships between the outputs of the strain sensing elements 10a, 10b, or 11a, 11b and temperature, although higher order fitting may be necessary in some cases. Similar approaches could be used for correction for elevation, or correction of thermal output for different transducer types described previously. The highest degree of correction is achieved by calibrating the entire coupler 1 (with sensors) in a thermal chamber or similar fixture. In the preferred embodiment, temperature correction provides the desired system accuracy (say 1% of full-scale) from −10 to 40° C., in accordance with NCWM Publication 14 and NIST Handbook 44.

As noted above, the wireless sensing unit 8 transmits and receives data with a communications manager 13 mounted locally on the railway vehicle car body. This short range allows for the use of low-power radios conforming to standards such as IEEE 802.15.4, for operation in the 2.4 GHz license-free band. In the preferred embodiment, the sensing units 8 are capable of being wireless routers, communicating with all other sensing units 8 for a redundant communication path to the manager 13. The manager 13 also continuously monitors and optimizes the network, dynamically changing data paths, and adjusting when sensing units 8 talk, listen, or sleep. Additionally, the preferred embodiment provides end-to-end data security with 128 bit AES-based encryption, or similar methods common to the art. Similar low-power wireless networks can be employed, and data transmission is not limited to the methods discussed herein.

In the preferred embodiment, the communications manager 13 includes a computation element such as a microcontroller, memory, a stand-alone power supply, and sensors. Sensors may include ambient temperature, barometric pressure, proximity, or inertial sensors. Additionally, the manager 13 incorporates several communication methods including the aforementioned wireless sensor network, cellular (GSM/GPRS), satellite, and Bluetooth or WiFi for local communications. The manager 13 may also incorporate a wireless sensing unit 8 for creating a network of managers 13 along the train. With an additional manager 13 in the locomotive or the like, data from all aforementioned sensors can be monitored in the locomotive. Various methods can be used for communications along the train.

The manager 13 also may include a location measurement device such as a global positioning system (GPS). The positioning system can be used to determine railway vehicle speed and location. Both speed and location can be used within algorithms to adjust wireless sensing unit 8 sampling rates, or inhibit data output altogether. For example, coupler forces may not be of interest when the car is sitting idle in a rail yard, so the location information could be used to inhibit the sampling and output of force readings, thus preserving energy on both the communications manager 13 and wireless sensing unit 8. Alternatively, coupler force readings may be required once every minute while the rail car is in motion, so it is necessary for the manager 13 to be able to adjust sensor 8 sampling rates based on a combination of parameters and user inputs.

What is claimed is:

1. A system for measuring the coupling forces between freight rail cars comprising:
    a coupler configured to connect a first rail car to a second rail car that is distinct from the first ail car;
    a first transducer mounted to the coupler;
    a second transducer mounted to the coupler;
    a third transducer mounted to the coupler;
    a fourth transducer mounted to the coupler, wherein the first transducer, the second transducer, the third transducer, and the fourth transducer are configured to measure forces at a rail vehicle connection;
    one or more sensors associated with the first, second, third, and fourth transducers for the acquisition, processing, and transmission of processed data from the first, second, third, and fourth transducers;
    and a receiver for communication with the one or more sensors and transmission of the processed data indicative of the forces at the rail vehicle connection.

2. The system in claim 1, wherein one or more of the first transducer, the second transducer, the third transducer, or the fourth transducer is a strain type transducer.

3. The system in claim 2, wherein one or more of the first transducer, the second transducer, the third transducer, or the fourth transducer includes an elastic element that is mechanically joined to the coupler.

4. The system in claim 2, wherein one or more of the first transducer, the second transducer, the third transducer, or the fourth transducer includes a strain gage.

5. The system in claim 3, wherein the elastic element mechanically multiplies an input displacement detected at the strain gage.

6. The system in claim 4, wherein a plurality of the strain gages are arranged in one or more Wheatstone bridge circuits.

7. The system in claim 1, wherein the first transducer, the second transducer, the third transducer, or the fourth transducer are mounted to a predetermined location on the coupler using a method comprised of:
    a step of stress analysis using analytical or numerical techniques, wherein typical loads are simulated on the coupler and transducer locations are selected based on stress response;
    a step of experimental stress analysis, wherein the coupler is instrumented with appropriate transducers for the verification of computed stress from the stress analysis.

8. The system in claim 1, wherein the first transducer, the second transducer, the third transducer, or the fourth transducer are mounted symmetrically along either the exterior shank of the coupler or around drilled through-holes in the coupler.

9. The system in claim 1, wherein each sensor is comprised of:
    a computational element for collecting transducer readings;
    a memory storage element;
    a wireless transceiver for sending and receiving data;
    a temperature detector for measuring the temperature near the mounting location of the transducers;
    and a motion detector for the indication of motion of the railway vehicle.

10. The system in claim 9, wherein the computational element is used to control the sampling of the first transducer, the second transducer, the third transducer, or the fourth transducer and for performing analysis on the transducer readings.

11. The system in claim 9, wherein the memory storage element is used to store the transducer, temperature, or motion detection readings.

12. The system in claim 9, wherein the wireless transceiver communicates with one or more of the sensors, all of which communicate with the receiver, so that multiple communication paths are open for data transmission.

13. The system in claim 9, wherein the motion detector is used to determine if the railway vehicle is in motion and to change the data collection settings accordingly.

14. The system in claim 9, wherein the computational element is used to compute the rate of the readings taken from the temperature detector.

15. The system in claim 9, wherein the computational element is used to adjust the transducer readings based on the rates and temperature readings.

16. The system in claim 1, wherein the sensors transmit synchronized transducer readings to the receiver.

17. The system in claim 1, wherein the receiver comprises:
    a data control unit for receiving readings from one or more of the sensors;
    a communication element for transmitting data to a remote location;
    a computational element for analyzing the data received from one or more of the sensors;
    a detector for determining the speed of the railway vehicle;
    and a positioning element for determining the location of the railway vehicle.

18. The system in claim 17, wherein the data control unit programs computational element on the sensors to control the sampling of the first transducer, the second transducer, the third transducer, or the fourth transducer and the rate at which readings shall be transmitted to the receiver.

19. The system of claim 1, wherein the first transducer and the second transducer are mounted on a first side of a shank of the coupler, wherein the third transducer and the fourth transducer are mounted on a second side of the shank of the coupler, and wherein the second side is opposite from the first side.

20. The system of claim 1, wherein the first transducer and the second transducer are mounted on a top surface of the coupler, Wherein the third transducer and the fourth transducer are mounted on a bottom surface of the coupler, and wherein the top surface is opposite from the bottom surface.

21. The system of claim 1, wherein the first transducer and the second transducer are mounted on a first through-hole formed in a top surface of the coupler, and wherein the third transducer and the fourth transducer are mounted on a second through-hole formed in a bottom surface of the coupler.

22. The system of claim 1, further comprising:
a fifth transducer mounted to the coupler;
a sixth transducer mounted to the coupler;
a seventh transducer mounted to the coupler; and
an eighth transducer mounted to the coupler.

23. The system of claim 22, wherein the first transducer and the second transducer are mounted on a first side of a shank of the coupler, wherein the third transducer and the fourth transducer are mounted on a second side of the shank of the coupler, wherein the second side is opposite from the first side, wherein the fifth transducer and the sixth transducer are mounted on a top surface of the coupler, wherein the seventh transducer and the eighth transducer are mounted on a bottom surface of the coupler, and wherein the top surface is opposite from the bottom surface.

24. The system of claim 22, wherein the first transducer, the second transducer, the third transducer, and the fourth transducer are mounted on a first through-hole formed in a top surface of the coupler, and wherein the fifth transducer, the sixth transducer, the seventh transducer, and the eighth transducer are mounted on a second through-hole formed in a bottom surface of the coupler.

25. The system of claim 24, wherein the first transducer, the second transducer, the third transducer, and the fourth transducer are mounted 90 degrees apart around a first circumference of the first through-hole, and wherein the fifth transducer, the sixth transducer, the seventh transducer, and the eighth transducer are mounted 90 degrees apart around a second circumference of the second through-hole.

26. The system of claim 24, further comprising:
a ninth transducer mounted on a first side of a shank of the coupler;
a tenth transducer mounted on the first side of the shank of the coupler;
an eleventh transducer mounted on a second side of the shank of the coupler, wherein the second side is opposite from the first side; and
a twelfth transducer mounted on the second side of the shank of the coupler.

27. A system for measuring the coupling forces between freight rail cars comprising:
a coupler con figured to connect a first rail car to a second rail car that is distinct from the first rail car;
a first transducer mounted to the coupler;
a second transducer mounted to the coupler;
a third transducer mounted to the coupler; and
a fourth transducer mounted to the coupler, wherein the first transducer, the second transducer, the third transducer, and the fourth transducer are configured to measure forces at a rail vehicle connection,
wherein the first transducer and the second transducer are mounted on a first through-hole formed in a top surface of the coupler, and wherein the third transducer and the fourth transducer are mounted on a second through-hole formed in a bottom surface of the coupler.

28. The system of claim 27, further comprising:
a fifth transducer mounted to the coupler;
a sixth transducer mounted to the coupler;
a seventh transducer mounted to the coupler; and
an eighth transducer mounted to the coupler.

29. The system of claim 28, wherein the fifth transducer and the sixth transducer are mounted on a top surface of the coupler, wherein the seventh transducer and the eighth transducer are mounted on a bottom surface of the coupler, and wherein the top surface is opposite from the bottom surface.

30. The system of claim 27, wherein the first transducer and the second transducer are mounted 90 degrees apart around a first circumference of the first through-hole, and wherein the fifth transducer, the sixth transducer, the seventh transducer, and the eighth transducer are mounted 90 degrees apart.

31. The system of claim 30, further comprising:
a ninth transducer mounted on a first side of a shank of the coupler;
a tenth transducer mounted on the first side of the shank of the coupler;
an eleventh transducer mounted on a second side of the shank of the coupler, wherein the second side is opposite from the first side; and
a twelfth transducer mounted on the second side of the shank of the coupler.

* * * * *